(12) United States Patent
Dinh et al.

(10) Patent No.: US 10,896,077 B2
(45) Date of Patent: Jan. 19, 2021

(54) MESSAGING ABSTRACTION LAYER FOR INTEGRATION WITH MESSAGE ORIENTED MIDDLEWARE PLATFORMS

(71) Applicant: Dell Products L.P., Round Rock, TX (US)

(72) Inventors: Hung Dinh, Austin, TX (US); Krishna Akkinapalli, Austin, TX (US); Gnanesh Gowda, Westborough, MA (US); Reddeppa Kollu, Leander, TX (US); Sabu Syed, Austin, TX (US); Craig Van Der Bogart, Cedar Park, TX (US); Satish Das, Round Rock, TX (US); Karan Kapoor, Bangalore (IN); Panguluru Vijaya Sekhar, Bangalore (IN); Vinay Sathyanarayana, Bangalore (IN); Abhijit Mishra, Bangalore (IN); Vellore Mohammed Imran, Bangalore (IN); Tousif Mohammed, Bangalore (IN); Nagireddy Bonthu, Hydarbad (IN); Vinod Kumar, Bangalore (IN); Puttaraju Bommanna Chikkanna, Bangalore (IN); John Kenneth Maxi, New Orleans, LA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/353,703

(22) Filed: Mar. 14, 2019

(65) Prior Publication Data
US 2020/0293386 A1    Sep. 17, 2020

(51) Int. Cl.
G06F 9/54 (2006.01)
H04L 29/08 (2006.01)

(52) U.S. Cl.
CPC .......... *G06F 9/546* (2013.01); *H04L 67/2809* (2013.01); *G06F 2209/547* (2013.01)

(58) Field of Classification Search
CPC .. G06F 15/16; G06F 15/163; G06F 2209/547; G06F 9/546; H04L 67/2809
See application file for complete search history.

(56) References Cited

U.S. PATENT DOCUMENTS

| | | | |
|---|---|---|---|
| 6,738,975 B1 * | 5/2004 | Yee | G06F 9/541 719/310 |
| 7,093,261 B1 * | 8/2006 | Harper | H04W 4/12 719/310 |

(Continued)

OTHER PUBLICATIONS

Oracle, "10. Oracle JCA Adapter for MQ Series," Fusion Middleware User's Guide for Technology Adapters, https://docs.oracle.com/cd/E21764_01/integration.1111/e10231/adptr_mq.htm#TKADP1598, Jan. 18, 2019, 90 pages.

(Continued)

*Primary Examiner* — James A Edwards
(74) *Attorney, Agent, or Firm* — Ryan, Mason & Lewis, LLP

(57) ABSTRACT

An apparatus in one embodiment comprises at least one processing platform comprising a plurality of processing devices. The at least one processing platform is configured to provide a plurality of applications with centralized access to a plurality of message oriented middleware (MOM) servers via a connectivity layer, to establish a connection between a given one of the plurality of applications and a given one of the plurality of MOM servers via the connectivity layer, and to exchange data between the given one of the plurality of applications and the given one of the plurality of MOM servers via the connectivity layer.

20 Claims, 10 Drawing Sheets

(56) References Cited

U.S. PATENT DOCUMENTS

| | | | | |
|---|---|---|---|---|
| 2002/0120717 | A1* | 8/2002 | Giotta | G06F 9/542 709/219 |
| 2005/0240654 | A1* | 10/2005 | Wolber | G06F 9/465 709/206 |
| 2005/0278374 | A1* | 12/2005 | Patrick | G06F 16/20 |
| 2006/0010195 | A1* | 1/2006 | Mamou | G06Q 10/10 709/203 |
| 2009/0138891 | A1* | 5/2009 | Winig | G06F 9/541 719/313 |
| 2013/0007184 | A1* | 1/2013 | Winn | G06F 9/544 709/213 |
| 2014/0068630 | A1* | 3/2014 | Fildebrandt | G06F 9/546 719/313 |
| 2019/0182558 | A1* | 6/2019 | Stern | H04N 21/4545 |

OTHER PUBLICATIONS

Richard Hamilton, "MQ API Exerciser," Application Integration Middleware Support Blog, https://www.ibm.com/developerworks/community/blogs/aimsupport/entry/mq_api_exerciser?lang=en, Jan. 13, 2011, 3 pages.

Wikipedia, "Enterprise Service Bus," https://en.wikipedia.org/wiki/Enterprise_service_bus, Dec. 14, 2018, 7 pages.

Wikipedia, "Microservices," https://en.wikipedia.org/wiki/Microservices, Jan. 19, 2019, 7 pages.

Wikipedia, "Service-Oriented Architecture," https://en.wikipedia.org/wiki/Service-oriented_architecture, Jan. 14, 2019, 11 pages.

Baeldung, "Introduction to Spring—Integration," https://www.baeldung.com/spring-integration, Aug. 23, 2018, 10 pages.

Pivotal Software, Inc., "Pivotal Releases Spring 4.0 Framework for Modern Java Application Development," https://pivotal.io/agile/press-release/pivotal-releases-spring-framework-for-modern-java-application-development, Dec. 12, 2013, 4 pages.

Margaret Rouse, "Service-Oriented Architecture (SOA)," https://searchmicroservices.techtarget.com/definition/service-oriented-architecture-SOA, Mar. 2018, 6 pages.

U.S. Appl. No. 15/881,369 filed in the name of Gnanesh Gowda et al. on Jan. 26, 2018 and entitled "Centralized Enterprise Integration and Services Monitoring Portal."

U.S. Appl. No. 16/242,645 filed in the name of Hung Dinh et al. on Jan. 8, 2019 and entitled "Internet of Things Connectivity Platform."

* cited by examiner

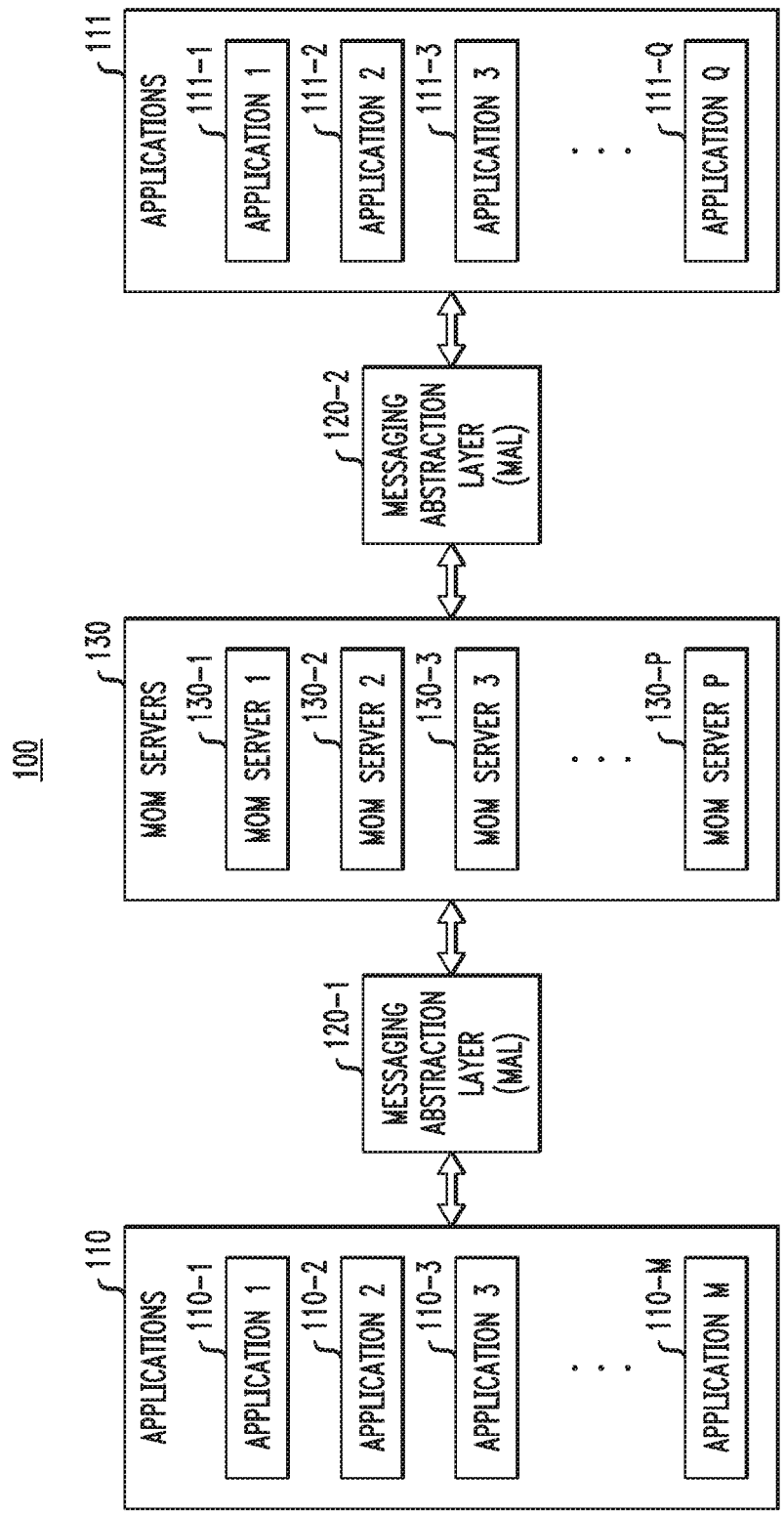

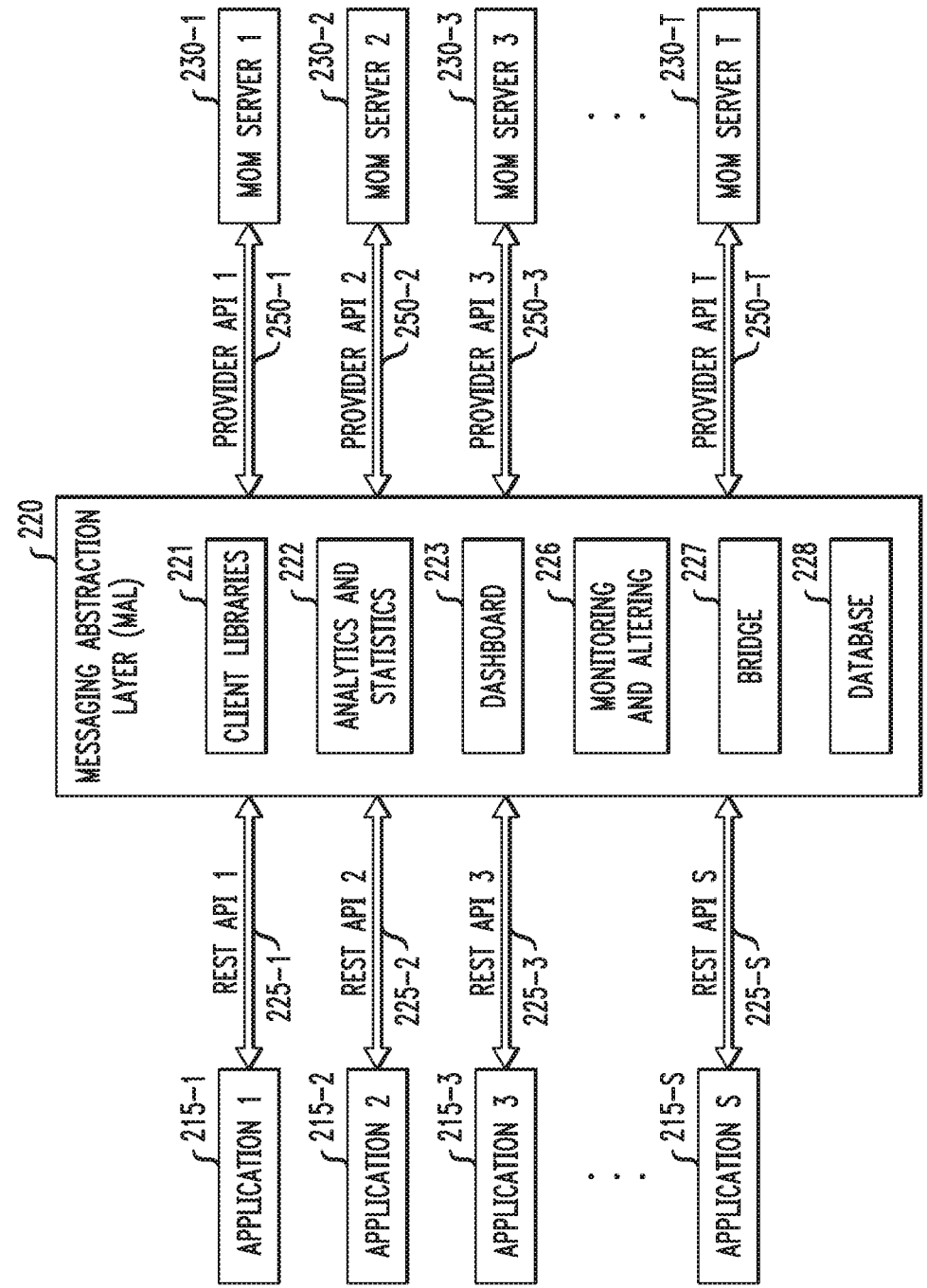

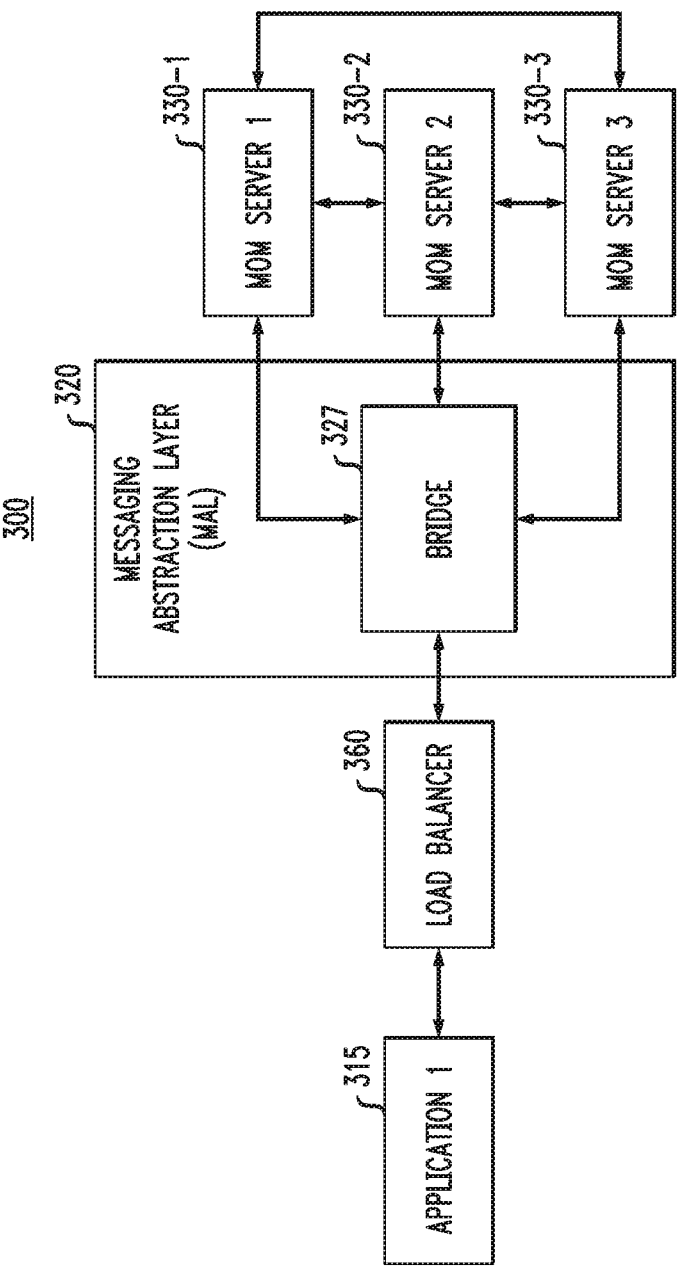

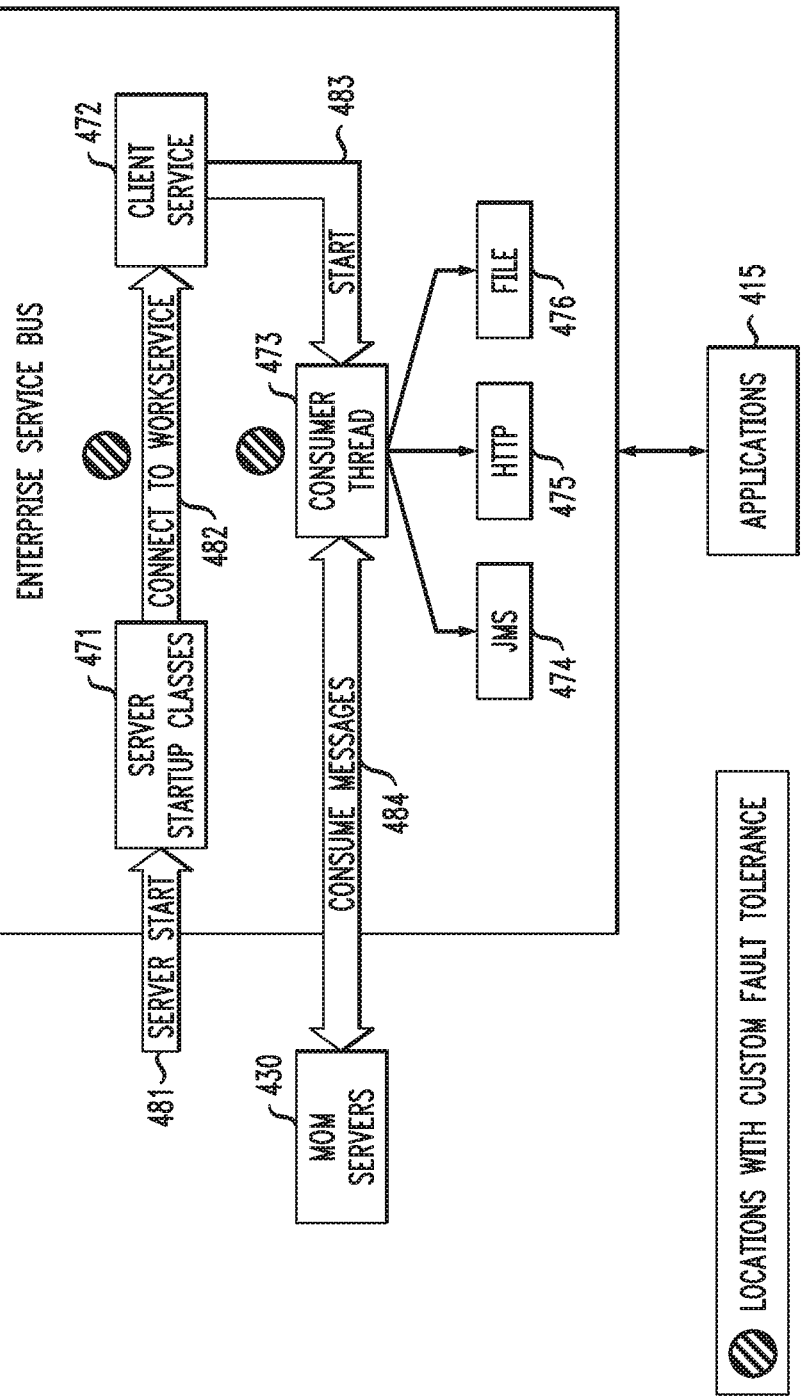

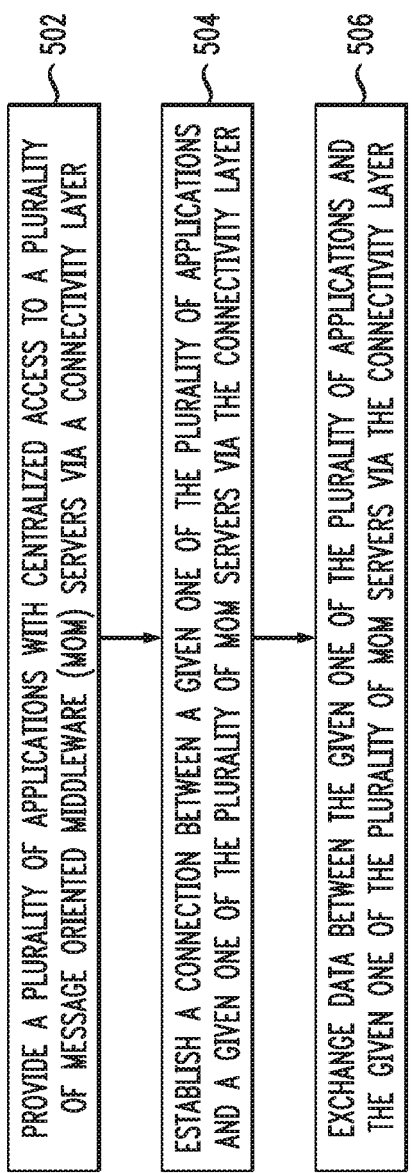

FIG. 5
500

- 502 PROVIDE A PLURALITY OF APPLICATIONS WITH CENTRALIZED ACCESS TO A PLURALITY OF MESSAGE ORIENTED MIDDLEWARE (MOM) SERVERS VIA A CONNECTIVITY LAYER
- 504 ESTABLISH A CONNECTION BETWEEN A GIVEN ONE OF THE PLURALITY OF APPLICATIONS AND A GIVEN ONE OF THE PLURALITY OF MOM SERVERS VIA THE CONNECTIVITY LAYER
- 506 EXCHANGE DATA BETWEEN THE GIVEN ONE OF THE PLURALITY OF APPLICATIONS AND THE GIVEN ONE OF THE PLURALITY OF MOM SERVERS VIA THE CONNECTIVITY LAYER

FIG. 6A
600

```
<!-- IBM MQ JMS configuration -->
<bean id="ibmQueueConnectionFactory"
class="com.ibm.mq.jms.MQQueueConnectionFactory" autowire="no" primary="true">
<property name="hostName" value="${ibm.mq.host}" />
<property name="port" value="${ibm.mq.port}" />
<property name="queueManager" value="${ibm.mq.queue.manager}" />
<property name="channel" value="${ibm.mq.channel}" />
<property name="transportType" >
<util:constant static-field="com.ibm.mq.jms.JMSC.MQJMS_TP_CLIENT_MQ_TCPIP" />
</property>
</bean>
```

FIG. 6B
605

```xml
<!-- JMS Queue Connection Factory -->
<bean id="jmsSourceQueueConnectionFactory"
class="org.springframework.jms.connection.SingleConnectionFactory">
<property name="targetConnectionFactory" ref="ibmQueueConnectionFactory"
/>
</bean>
<!-- JMS Destination Resolver -->
<bean id="jmsSourceDestinationResolver"
class="org.springframework.jms.support.destination.DynamicDestinationResolver">
/>
<!-- JMS Queue Template -->
<bean id="jmsQueueTemplate"
class="org.springframework.jms.core.JmsTemplate">
<property name="connectionFactory" ref="jmsSourceQueueConnectionFactory"
/>
<property name="destinationResolver" ref="jmsSourceDestinationResolver" />
<property name="pubSubDomain" value="false" />
<property name="receiveTimeout" value="2000" />
</bean>
```

```xml
<bean id="reading_From_IBM_MQ" class="com.ibm.mq.jms.MQQueue" >
<constructor-arg value="${ibm.mq.queue.name}" />
<property name="targetClient">
<util:constant static-field="com.ibm.mq.jms.JMSC.MQJMS_CLIENT_JMS_COMPLIANT" />
</property>
</bean>
<!-- mq_Error_Channel is for error caused during the process -->
<int:channel id="mq_Error_Channel"> </int:channel>
<!-- Reading the messages from IBM MQ queue to channel -->
<int-jms:message-driven-channel-adapter id="recieve_Message_From_IBM"
channel="amqp_Out_Channel" error-channel="mq_Error_Channel"
concurrent-consumers="${concurrent-consumers}" max-concurrent-consumers="${max-concurrent-consumers}"
destination="reading_From_IBM_MQ"
connection-factory="jmsSourceQueueConnectionFactory"/>
```

```
<!-- pushing the failed messages to the Queue which is read from the IBM MQ Queue -->
<int-jms:outbound-channel-adapter id="sendMessagetoIBM"
channel="mq_Error_Channel" destination="reading_From_IBM_MQ" connection-
factory="jmsSourceQueueConnectionFactory"/>
</int-jms:outbound-channel-adapter>
<!--
==========================================================
<!-- Rabbit MQ amqp configuration -->
<!-- ==========================================================
<!-- Abstract rabbit template which can be used to create multiple rabbit
templates based on connection factories -->
<bean id="abstractRabbitTemplate"
class="org.springframework.amqp.rabbit.core.RabbitTemplate" abstract="true" />
```

```xml
<bean id="ConnectionFactory"
class="org.springframework.amqp.rabbit.connection.CachingConnectionFactory"
abstract="false">
<property name="host" value="${rabbit.mq.host}" />
<property name="port" value="${rabbit.mq.port}" />
<property name="username" value="${rabbit.mq.username}" />
<property name="password" value="${rabbit.mq.password}" />
<property name="virtualHost" value="${rabbit.mq.virtual-host}" />
</bean>
<rabbit:template id="amqp_Template" connection-factory="ConnectionFactory" />
<!-- pushing to the rabbit mq -->
<int:channel id="amqp_Out_Channel"></int:channel>
<int-amqp:outbound-channel-adapter id="write_Message_To_Rabbit_MQ"
routing-key="${rabbit.mq.queue.name}" channel="amqp_Out_Channel" amqp-
template="amqp_Template" exchange-name="" ">
</int-amqp:outbound-channel-adapter>
```

US 10,896,077 B2

MESSAGING ABSTRACTION LAYER FOR INTEGRATION WITH MESSAGE ORIENTED MIDDLEWARE PLATFORMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for messaging in such environments.

BACKGROUND

Message Oriented Middleware (MOM) is a form of middleware which is capable of facilitating transportation of messages from one component to another. Client libraries provide necessary software and functionality for building and developing code to integrate and connect devices and applications to MOM platforms for transmission and receipt of messages. There are currently many different client libraries, which implement connectivity/messaging protocols for MOM platforms. However, the implementations of the different client libraries are not consistent across different MOM platforms. For example, due to the various and inconsistent client libraries associated with the different MOM platforms, it is difficult for an enterprise to connect with more than one MOM platform when using conventional techniques.

Existing connection protocols do not account for the current variability between client libraries, fail to provide adequate solutions to address the increased complexity associated with interfacing enterprise applications with different MOM platforms.

SUMMARY

Illustrative embodiments provide techniques for streamlining connectivity to MOM platforms with a messaging abstraction layer, which allows enterprise applications to seamlessly connect to differently implemented MOM platforms, thereby overcoming one or more of the above-noted difficulties of conventional practice. For example, by providing a uniform connectivity solution which permits access to and seamless switching between various MOM vendors, regardless of platform, some embodiments considerably reduce the amounts of computational and memory resources that are associated with the inconsistent implementation of messaging protocols.

In one embodiment, an apparatus comprises at least one processing platform including a plurality of processing devices. The processing platform is configured to provide a plurality of applications with centralized access to a plurality of message oriented middleware (MOM) servers via a connectivity layer, to establish a connection between a given one of the plurality of applications and a given one of the plurality of MOM servers via the connectivity layer, and to exchange data between the given one of the plurality of applications and the given one of the plurality of MOM servers via the connectivity layer.

For example, in connection with providing the applications with centralized access to the MOM servers, a plurality of application programming interfaces (APIs) (e.g., Representational State Transfer (REST) APIs) are implemented to interface with respective ones of the plurality of applications. The connectivity layer also interfaces with respective MOM server APIs.

In some embodiments, the connectivity layer includes a bridge component configured to route data from a given one of the plurality of applications to two or more MOM servers of the plurality of MOM servers, and to route the data from one of the two or more MOM servers to another one of the two or more MOM servers.

In one or more embodiments, the connectivity layer may be implemented at least in part as an add-on component to an enterprise service bus (ESB), and be configured to publish messages using a plurality of message transport protocols.

These and other illustrative embodiments include, without limitation, apparatus, systems, methods and computer program products comprising processor-readable storage media.

BRIEF DESCRIPTION OF THE DRAWINGS

FIG. 1 illustrates an information processing system implementing one or more messaging abstraction layers, according to an illustrative embodiment.

FIG. 2 illustrates an exemplary architecture for a messaging abstraction layer, according to an illustrative embodiment.

FIG. 3 illustrates an exemplary architecture for a messaging abstraction layer including a bridge for allowing data to flow between different targets, according to an illustrative embodiment.

FIG. 4 illustrates an exemplary architecture for an ESB including enhancements providing messaging abstraction layer functionality, according to an illustrative embodiment.

FIG. 5 illustrates a methodology for providing connectivity with a messaging abstraction layer, according to an illustrative embodiment.

FIGS. 6A, 6B, 6C, 6D and 6E show example pseudocode for allowing data to flow from a first MOM platform to a second MOM platform, according to an illustrative embodiment.

DETAILED DESCRIPTION

Figure 7:
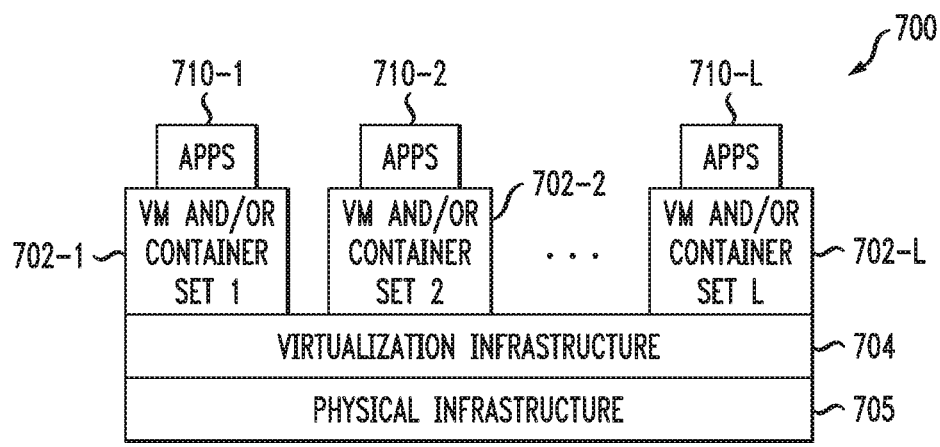
FIGS. 7 and 8 show examples of processing platforms that may be utilized to implement at least a portion of an information processing system in illustrative embodiments.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

FIG. 1 shows an information processing system 100 implementing messaging abstraction layers 120-1 and 120-2 in accordance with an illustrative embodiment. Information processing system 100 comprises a plurality of enterprise applications 110 and 111 operatively coupled (e.g., via one or more communication networks) to respective messaging abstract layers (MALs) 120-1 and 120-2. The one or more communication networks may comprise any of a variety of different types of networks, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The applications 110 include a plurality of enterprise applications (e.g., Application 1, Application 2, Application 3 . . . Application M, respectively denoted by reference numerals 110-1, 110-2, 110-3 . . . 110-M), and the applications 111 include a plurality of enterprise applications (e.g., Application 1, Application 2, Application 3 . . . Application Q, respectively denoted by reference numerals 111-1, 111-2, 111-3 . . . 111-Q). The variables M, Q and other similar index variables herein such as K, L, P, S and T are assumed to be arbitrary positive integers greater than or equal to two.

The applications 110 and 111 comprise, for example: (i) platforms for business process automation, which enable communication between different software systems used in an enterprise (e.g., Microsoft® BizTalk); (ii) platforms to provide programming language interoperability (e.g., Microsoft®.NET framework); (iii) platforms to provide support for web applications through, for example, servlets, struts or Java® Server Pages (JSPs) (e.g., Java® applications); (iv) platforms for programming using certain programming languages (e.g., C, C++) to create, for example, computer applications, firmware, verification software, test code and/or simulators for various applications and hardware products; (v) platforms to provide service-oriented architecture (SOA) services including, but not necessarily limited to, distributed application components incorporating discovery, access control, data mapping and security features; and (vi) platforms to provide microservices including, but not necessarily limited to, collections of loosely coupled, fine-grained and parallelized services implementing lightweight protocols.

The applications 110 and 111 may be operatively coupled (e.g., via one or more communication networks) to one or more backend services (not shown). In accordance with the present disclosure, the one or more backend services can include, for example, database management systems, such as database servers for storing and retrieving data as requested by applications (e.g., SAP® database (SAP America Inc., Newtown Square, Pa.) and Oracle® database (Oracle Corporation, Redwood City, Calif.)). The backend services may also include third-party customer relationship management (CRM) applications providing enterprises with an interface for case and task management (e.g., Salesforce.com® (Salesforce.com Inc., San Francisco, Calif.)), and cloud environments for enterprise solutions including, for example, information management, compliance, and B2B integration (e.g. OpenText™ Cloud (Open Text SA ULC, Halifax, Nova Scotia, Canada)).

Applications 110 and 111 are configured to send and/or receive messages with data via the MALs 120-1 and 120-2, respectively and via one or more MOM servers 130 (e.g., MOM Server 1, MOM Server 2, MOM Server 3 . . . MOM Server P, respectively denoted by reference numerals 130-1, 130-2, 130-3 . . . 130-P). The MALs 120-1 and 120-2 are operatively coupled (e.g., via one or more communication networks) between the applications 110 and 111, respectively, and the MOM servers 130. The MALs 120-1 and 120-2 each provide a centralized interface between the plurality of MOM servers 130 and respective pluralities of applications 110 and 111. The MALs 120-1 and 120-2 are compatible with each of the one or more MOM servers 130, and each of the plurality of applications 110 and/or 111. Although two MALs 120-1 and 120-2 are shown in FIG. 1, the embodiments are not necessarily limited thereto. For example, one MAL (e.g., MAL 120-1) can be operatively coupled to both pluralities of applications 110 and 111 and the plurality of MOM servers 130. In another example, more than two MALs can be connected to the plurality of MOM servers and to additional pluralities of applications. A MAL can be an enterprise-based and/or cloud-based computer system. The MALs 120-1 and 120-2 (and MALs 220 and 320 discussed in connection with FIGS. 2 and 3) are examples of what is more generally referred to herein as a "connectivity layer."

The MOM servers 130 permit data exchange between distributed applications by sending and receiving messages. For example, an application with data to distribute sends a message with the data to another connected application configured to receive the message. The message is sent via one or more MALs and one or more MOM servers 130 to the connected application. The data which is transmitted and/or received can include, but is not necessarily limited to, operational, diagnostic, performance, inventory and/or location data.

As described further herein, the MOM servers 130 include architectures with, for example, application programming interfaces (APIs) and administrative tools to route and deliver messages. In an embodiment, the MOM servers 130-1, 130-2, 130-3 . . . 130-P respectively run on different operating systems and/or platforms or different implementations of the same operating system and/or platforms. For example, the MOM servers 130 are of different types, and require different functionality or implementations of connectivity/messaging protocols, such as, for example, machine-to-machine (M2M) messaging protocols. In a non-limiting embodiment, M2M protocols can include, but are not necessarily limited to, Message Queuing Telemetry Transport (MQTT), constrained application protocol (CoAP), and/or OMA lightweight machine to machine (LWM2M).

In a non-limiting example, the MOM servers 130 can respectively correspond to different MOM servers 130 from different sources, which run different software and have different capabilities. Some non-limiting examples of MOM servers 130 which may be compatible with the MALs 120-1 and 120-2 are IBM® MQ (International Business Machines Corporation, Armonk, NY), RabbitMQ® (Pivotal Software, Inc., San Francisco, Calif.), Apache™ ActiveMQ® and Apache™ Kafka® (Apache Software Foundation, Wakefield, Mass.). One or more of the MOM servers 130 can be, for example, closed and proprietary, while one or more other MOM servers 130 can be, for example, open source. The MALs 120-1 and 120-2 are vendor agnostic layers, and are, therefore, compatible with the different MOM servers 130, or other types of middleware capable of facilitating transportation of messages from one component to another.

In accordance with one or more embodiments, as explained further herein, instead of an application being limited to connect only with one MOM server, a MAL includes functionality to permit an application to seamlessly have access to and switch between multiple MOM servers. The MALs disclosed herein (e.g., MALs 120-1, 120-2, 220 and 320) can be controlled and operated by a single enterprise. According to one or more embodiments, MALs 120-1, 120-2, 220 and 320 provide applications with seamless connections to and from heterogeneous MOM servers.

FIG. 2 illustrates an exemplary architecture of an information processing system 200 including a MAL 220, which includes a plurality of common consistent APIs 225 (e.g., REST API 1, REST API 2, REST API 3 . . . REST API S, respectively denoted by reference numerals 225-1, 225-2, 225-3 . . . 225-S). In accordance with one or more embodiments, the APIs comprise REST APIs. The APIs 225 provide applications 215 (e.g., Application 1, Application 2, Application 3 . . . Application S, respectively denoted by reference numerals 215-1, 215-2, 215-3 . . . 215-S) with access to and functionality to switch between different MOM servers 230 (e.g., MOM Server 1, MOM Server 2, MOM Server 3 . . . MOM Server T, respectively denoted by reference numerals 230-1, 230-2, 230-3 . . . 230-T). In an embodiment, the MOM servers 230-1, 230-2, 230-3 . . . 230-T respectively run on different operating systems and/or platforms or different implementations of the same operating system and/or platforms. For example, the MOM servers 230 are of different types, and require different functionality or implementations of connectivity/messaging protocols.

According to one or more embodiments, using the APIs 225, MOM server switching can be abstracted from publisher and consumer applications. An application 215 may be a publisher of and/or a subscriber to information organized as a hierarchy of topics. For example, a publisher with data to distribute sends a message with the data via the MAL 220 and one or more of the MOM servers 230, which distribute the data to those applications 215 having a subscription to that topic. Each of the APIs 225 are configured to provide access to any of the MOM servers 230 in order to send or receive messages in a manner that is transparent to publisher and consumer applications.

In an illustrative embodiment, during an initialization process between an application 215 and the MAL 220, a specification can be made which assigns a particular MOM server 230 to a given application 215. The specification may be made, for example, in programming of the application 215 or by one or more administrators linking the application 215 to the MAL 220. The API 225 associated with the given application 215 is configured in accordance with the specification. According to one or more embodiments, the assignment of a given application 215 to a MOM server 230 may be dynamic and change according to one or more conditions to specify, for example, a different host and port number corresponding to a different MOM server 230. In the case of a modification to a different MOM server 230, the API 225 associated with the given application 215 is reconfigured in accordance with the modification.

The MAL 220 centrally includes functionality of a plurality of different client libraries 221 and/or is configured to implement multiple client libraries 221 to connect multiple applications 215 to multiple MOM servers 230 of different types. The MAL 220 includes analytics and statistics logic 222 to analyze and process connection and message publishing requests specifying particular applications 215 and/or MOM servers 230 and to determine subscription information received from applications 215. Messaging requests can specify, for example, port, queue name and type, channel, host name and/or one or more MOM servers or platforms. The MAL 220 further includes or has access to one or more databases 228 including data for applications 215 and MOM servers 230, such as, for example, topic, subscription and/or identification information, which can be used to verify application and MOM server requests and/or communications.

The analytics and statistics logic 222 further collects data on active or past requests, connections and/or data transmissions, which is provided to a dashboard component 223 for reporting status information to one or more MAL administrators monitoring the activity of the MAL 220. According to an embodiment, reporting can be performed via a user interface on one or more administrator devices operatively coupled to the MAL 220 via one or more communication networks.

According to one or more embodiments, the MAL 220 further includes a monitoring and alerting component 226 for providing alerts to one or more users when, for example, messages fail to transmit and/or connections to one or more MOM servers 230 fail or time out. Alerts can be transmitted to one or more user devices from the MAL 220 via one or more communication networks.

The MAL 220 further includes a bridge component 227 bridge for allowing data to flow from an application 215 between different MOM servers 230. Functionality of a bridge component is discussed further herein in connection with FIG. 3.

According to one or more embodiments, the MAL 220 can be built on an application framework for the Java® platform, such as the Pivotal® Spring Framework® (Pivotal Software, Inc., San Francisco, Calif.), and the MAL 220 may be relatively lightweight and customizable. Although the present disclosure is discussed in connection with Java® implementations, the embodiments are not necessarily limited thereto, and other programming languages may be used.

In accordance with one or more embodiments, a plurality of MOM provider APIs 250 (e.g., Provider API 1, Provider API 2, Provider API 3 . . . Provider API T, respectively denoted by reference numerals 250-1, 250-2, 250-3 . . . 250-T) are used to interface the MAL 220 with respective ones of the plurality of MOM servers 230. The provider APIs 250 are used by the MAL 220 to maximize performance when receiving data from the respective ones of the plurality of MOM servers 230. For example, the provider APIs 250 are used to maximize performance when interfacing with the MOM servers 230 because the provider APIs 250 are native to the MOM servers 230, directly calling Transmission Control Protocol (TCP) socket APIs (TSAPIs) so there is no layer between the provider APIs 250 and the TSAPIs.

The MAL 220 is also configured to be updated dynamically in response to changes in the applications, APIs and/or other functionality required for connecting to one or more of the MOM servers 230. Such updates can be, for example, dynamically performed to MAL 220 based on existing connections and/or agreements between the MAL 220 and the MOM servers 230, or added to the MAL 220 by one or more users.

In FIG. 3, an exemplary architecture for an information processing system 300 includes a MAL 320 having a bridge component 327 for allowing data to flow from an application 315 to and/or between a plurality of different MOM servers 330 (e.g., MOM Server 1, MOM Server 2 and MOM Server 3, respectively denoted by reference numerals 330-1, 330-2 and 330-3). The number of MOM servers is not limited to three. For example, the number of MOM servers in this example may be two or more. In an embodiment, the MOM servers 330-1, 330-2 and 330-3 respectively run on different operating systems and/or platforms or different implementations of the same operating system and/or platforms. For example, the MOM servers 330 are of different types, and require different functionality or implementations of connectivity/messaging protocols.

In accordance with the information processing system 300, instead of transmitting message data from an application 315 via a single MOM server, message data from an application 315 flows to multiple MOM servers 330 via bridge component 327, and can also flow between two or more MOM servers 330 using the bridge component 327. The functionality provided by the bridge component 327 can be useful when an application 315 is configured to be associated with more than one MOM server 330, such as, for example, when an application provider is in the process of transitioning or migrating from an affiliation with a first MOM provider to an affiliation with a second MOM provider, and an application's settings have not been fully changed from the first MOM provider to the second MOM provider. A load balancer 360 may be used to direct data flow to different MOM servers 330 based on, for example, round-robin (RR) scheduling settings and/or connection limit parameters set on the load balancer 360.

In the operational example of 3 different MOM servers 330-1, 330-2 and 330-3, the bridge component 327 can receive and process 6 data flow requests (e.g., MOM Server 1 to MOM Server 2, MOM Server 2 to MOM Server 1, MOM Server 1 to MOM Server 3, MOM Server 3 to MOM Server 1, MOM Server 2 to MOM Server 3 and MOM Server 3 to MOM Server 2). The bridge component 327 may be developed using, for example, platform development software, such as, Spring® Integration XML (Pivotal Software, Inc., San Francisco, Calif.).

In order to implement the bridge component 327, configuration files in the MAL 320 are created to pass messages between 3 different MOM servers 330-1, 330-2 and 330-3. If there is a failure in message transmission between the 3 different MOM servers 330-1, 330-2 and 330-3, the message will be pushed back to the queue from which the message was read.

FIGS. 6A, 6B, 6C, 6D and 6E show example pseudocode 600, 605, 610, 615 and 620, respectively, for allowing data to flow from a first MOM platform to a second MOM platform. The pseudocode includes specifications of the first and second MOM platforms through which the data is to flow, the properties of the servers associated with each of the platforms, such as, for example, host name, port, queue manager and channel values, and instructions on responses to failure events.

For example, in connection with FIGS. 6A-6E, "class" refers to a defined set of properties common to all objects of one type and from which the objects can be created. A class can include templates that are used to create objects, and to define object data types and methods. For example, in some cases, classes correspond to categories, and objects correspond to the items within each category. One or more embodiments may be implemented with several Java® classes, but the present disclosure not necessarily limited to Java® implementations, and other programming languages may be used. Referring to the psuedocode 600, a client uses an MQQueueConnectionFactory to create queue connections with a Java® Message Service (JMS) provider. "hostName," "port," "queueManager" and "channel" are parameters to be read from a configuration file by the application. The static variable "transportType" has a constant value of "com.ibm.mqjms.JMSC.MQJMS_TP_CLIENT_MQ_TCPIP."

Referring to the psuedocode 605 in FIG. 6B, class="org.springframework.jms.connection.SingleConnectionFactory" refers to a JMS "ConnectionFactory" adapter that returns the same connection on all "createConnection" calls, and ignores calls to "Connection.close( )." According to the JMS connection model, this is event thread-safe. class="org.springframework.jms.support.destination.DynamicDestinationResolver" is an implementation of the "DestinationResolver" interface, resolving destination names as dynamic destinations.

Referring to the psuedocode 610 in FIG. 6C, class="com.ibm.mq.jms.MQQueue" is an "MQQueue" object that encapsulates a provider-specific queue name, which is how a client specifies the identity of a queue for JMS processes.

Referring to the psuedocode 615 in FIG. 6D, class="org.springframework.amqp.rabbit.core. RabbitTemplate" is a helper class that simplifies sending and receiving of messages (e.g., synchronous RabbitMQ® access). For example, in response to a failed transmission, the pseudocode 615 in FIG. 6D specifies pushing back the message to the queue from which the message was read.

Referring to the psuedocode 620 in FIG. 6E, class="org.springframework.amqp.rabbit.connection. CachingConnectionFactory" is a ConnectionFactory implementation that, when the cache mode is "CachingConnectionFactory.CacheMode.CHANNEL (default)," returns the same connection from all "createConnection( )" calls, ignores calls to "Connection.close( )" and caches "Channel."

In FIG. 4, an information processing system 400 includes an ESB 470 with enhancements providing MAL functionality to the ESB 470. ESB 470 provides a communication system between applications in an SOA. Currently ESBs, such as, for example, Oracle® Service Bus (OSB) (Oracle Corporation, Redwood City, Calif.) and IBM® Integration Bus (IIB) (International Business Machines Corporation, Armonk, N.Y.) lack the ability to transport messages over more than one MOM platform. The ESB 470 includes a consumer thread 473, where messages from multiple MOM servers 430 can be published onto JMS protocol, HyperText Transfer Protocol (HTTP) and File protocol message transport protocols. The JMS, HTTP and File components 474, 475 and 476 are add-on components to an existing ESB 470 so that messages can be published to one or more applications 415 using a plurality of message transport protocols. As a result, ESB 470 is configured to consume messages (arrow 484) from multiple MOM servers 430 and publish the messages on to other transports such as, for example, JMS, File, HTTP. The add-ons are not necessarily limited to the JMS, HTTP and File components 474, 475 and 476.

The ESB 470 includes server start up classes 471 configured to start up servers based on API invocations configurable in application servers such as, for example, IBM® Web Sphere® application server or Oracle® WebLogic® application server. The client service component 472 represents one or more applications that communicate with a web server, using HTTP/HyperText Transfer Protocol Secure (HTTPS) and/or TSAPI, to serve the files that form webpages for users. Arrow 481 represents an external initial invocation call from a client to server start up classes 471, which then issue a webservice call (arrow 482) to client service component 472.

If client service component 472 determines to utilize separate threads to publish messages onto JMS protocol, HTTP and File protocol message transport protocols, the client service component 472 issues separate start commands (arrow 483) to each of the targets 474, 475 and 476. If client service component 472 determines to utilize the same thread to publish messages onto JMS protocol, HTTP and File protocol message transport protocols, the client service component 472 issues a start command (arrow 483) concurrently to each of the targets 474, 475 and 476. Locations with custom fault tolerance to maintain functionality in the event of failure of one or more components are designated with a hashed circle.

The information processing system 400 in FIG. 4 enables existing ESB users to continue to use an ESB with enhanced functionality for sending and receiving messages over more than one MOM platform and publishing the messages using multiple transport protocols. The add-on components to the ESB 470 providing the above-described enhanced functionality described in connection with FIG. 4 is another example of what is more generally referred to herein as a "connectivity layer."

By seamlessly connecting applications to multiple MOM servers, the MALs disclosed herein (e.g., MALs 120-1, 120-2, 220 and 320) and the enhanced ESB 470 greatly reduce the complexity of messaging middleware environments when compared with conventional systems. In addition, one or more embodiments provide solutions for users migrating between MOM platforms, such as, for example, from proprietary to open source platforms.

Each of the information processing systems 100, 200, 300 and 400, including the MALs 120-1, 120-2, 220 and 320 described in connection with FIGS. 1, 2 and 3, and the enhanced ESB 470 described in connection with FIG. 4, is assumed to comprise a plurality of processing devices each having a processor coupled to a memory. One or more such processing devices may be implemented at least in part utilizing one or more virtual machines, containers or other types of virtualization infrastructure. Examples of processing platforms implementing the information processing systems 100, 200, 300 and 400 will be described below in conjunction with FIGS. 7 and 8.

At least one of the processing platforms of systems 100, 200, 300 and 400 may more particularly comprise at least a portion of a cloud-based data center or other cloud-based computer system, although other types of processing platforms may be used in other embodiments. For example, in some embodiments, at least one of the processing platforms may comprise an enterprise-based computer system rather than a cloud-based computer system. A given cloud-based implementation of a particular one of the processing platforms illustratively includes commercially-available cloud infrastructure, such as an allocated portion of an AWS system. Other examples of cloud-based systems that can be used to implement one or more processing platforms of systems 100, 200, 300 and 400 include Google Cloud Platform (GCP) and Microsoft Azure®.

A cloud-based system of this type illustratively comprises a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer.

Each of the one or more processing platforms of systems 100, 200, 300 and 400 may be associated with one or more system users or administrators. The term "user" or "administrator" in this context and elsewhere herein is intended to be broadly construed so as to encompass, for example, human, hardware, software or firmware entities, as well as various combinations of such entities. At least some of the system users or administrators can be associated with various processing devices through which those users or administrators interface with various system components. These processing devices associated with system users or administrators can include, for example, desktop, laptop or tablet computers, mobile telephones, or other types and arrangements of devices that support user interfaces to functionality of systems 100, 200, 300 and 400.

Storage arrays associated with processing platforms of systems 100, 200, 300 and 400 may comprise, for example, at least one VNX® or Symmetrix VMAX® storage array from Dell EMC of Hopkinton, Mass. Other types of storage arrays that may be used in illustrative embodiments include scale-out all-flash content addressable storage arrays such as XtremIO™ storage arrays, also from Dell EMC.

The operation of the information processing systems 100, 200, 300 and 400 will now be described in further detail with reference to the flow diagram of the illustrative embodiment of FIG. 5. This figure illustrates a process 500 that includes steps 502, 504 and 506, and is suitable for use in systems 100, 200, 300 or 400, but is more generally applicable to other types of information processing systems including MOM server and application connectivity as described herein.

In step 502, a plurality of applications are provided with centralized access to a plurality of MOM servers via a connectivity layer. In providing the plurality of applications with centralized access to the plurality of MOM servers, a plurality of APIs are implemented to interface with respective ones of the plurality of applications. In an illustrative embodiment, the plurality of APIs comprise REST APIs. In addition, the connectivity layer interfaces with another plurality of APIs corresponding to respective ones of the plurality of MOM servers.

In step 504, a connection is established between a given one of the plurality of applications and a given one of the plurality of MOM servers via the connectivity layer, and in step 506 data is exchanged between the given one of the plurality of applications and the given one of the plurality of MOM servers via the connectivity layer.

In one or more embodiments, the connectivity layer implements a plurality of client libraries corresponding to respective ones of the plurality of MOM servers, and includes a bridge component configured to route data from a given one of the plurality of applications to two or more MOM servers of the plurality of MOM servers. The bridge component may be configured to route the data from one of the two or more MOM servers to another one of the two or more MOM servers. A load balancer may be operatively coupled between the given one of the plurality of applications and the connectivity layer to direct data flow to different MOM servers.

In one or more embodiments, the connectivity layer may be implemented at least in part as an add-on component to an ESB, and be configured to publish messages using a plurality of message transport protocols, such as, but not necessarily limited to, JMS protocol, File protocol and HTTP.

The MOM servers described herein may respectively correspond to different types. For example, one or more closed and proprietary MOM platforms, and one or more open source MOM platforms.

The particular processing operations and other system functionality described in conjunction with the flow diagram of FIG. 5 are presented by way of illustrative example only, and should not be construed as limiting the scope of the disclosure in any way. Alternative embodiments can use other types of processing operations for implementing the MOM server and application connectivity as described herein. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated connectivity processes within a given information processing system.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be noted that the particular arrangements illustrated in FIGS. 1 through 6 are presented by way of illustrative example only, and should not be construed as limiting in any way. As noted above, the described functionality for MOM server and application connectivity can be implemented using additional or alternative components, and in other processing contexts. Accordingly, a wide variety of different connectivity arrangements can be used in other embodiments. In addition the components of respective systems 100, 200, 300 or 400 are not necessarily limited to their corresponding systems as illustrated, and may be incorporated into other ones of the illustrated systems where appropriate.

The illustrative embodiments described above provide significant advantages over conventional arrangements. For example, some embodiments enable applications to seamlessly integrate with and switch between multiple MOM platforms, such as closed and proprietary platforms and open source platforms. While current technology fails to enable connections to multiple MOM platforms, the embodiments streamline connectivity stacks by introducing a vendor agnostic layer, such as, for example, MALs 120-1, 120-2, 220 and 320 or the add-on functionality to ESB 470, which permits seamless connections of enterprise applications to heterogeneous MOM servers. In contrast, in conventional arrangements, there are many client libraries, which separately and inconsistently implement messaging/connectivity protocols. In conventional architectures, connections between applications and MOM platforms are among numerous independently operating and non-uniform connectivity protocols. The embodiments instead provide a customized uniform message oriented connectivity solution which provides applications with access to various different MOM platforms.

Moreover, illustrative embodiments can provide significant advantages by permitting applications associated with enterprises transitioning or migrating from one MOM platform to another MOM platform to transmit data to and between multiple MOM platforms. One or more embodiments also provide existing ESB clients to modify their ESBs to accommodate enhanced functionality to consume and publish messages through multiple MOM platforms.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement at least portions of the MOM server and application connectivity functionality as disclosed herein will now be described in greater detail with reference to FIGS. 7 and 8. Although described in the context of systems 100, 200, 300 and 400, these platforms may also be used to implement at least portions of other information processing systems in other embodiments.

Figure 8:
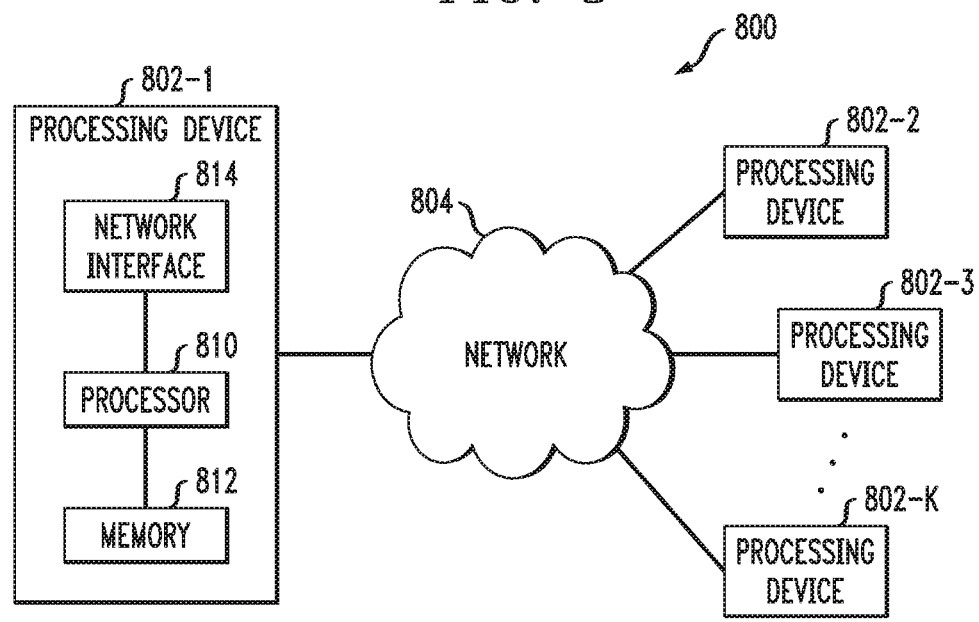

FIG. 7 shows an example processing platform comprising cloud infrastructure 700. The cloud infrastructure 700 comprises a combination of physical and virtual processing resources that may be utilized to implement at least a portion of the information processing system 100 or 200. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide MOM server and application connectivity functionality of the type described above at least in part utilizing processes running on the VMs. For example, different ones of the VMs can implement different portions of the MALs 120-1, 120-2, 220 and 320.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide MOM server and application connectivity functionality of the type described above at least in part utilizing processes running on the containers. For example, a container host device supporting multiple containers of one or more container sets can implement different portions of the MALs 120-1, 120-2, 220 and 320.

As is apparent from the above, one or more of the processing modules or other components of systems 100, 200, 300 and 400 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100, 200, 300 or 400 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a CPU, a graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and systems 100, 200, 300 and 400 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of an information processing system providing MOM server and application connectivity functionality as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems comprising different arrangements of processing platforms, networks, connectivity layers, MOM servers and enterprise applications. Also, the particular configurations of system and device elements and associated MOM server and application connectivity processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing platform comprising a plurality of processing devices;
    said at least one processing platform being configured:
    to provide a plurality of applications with centralized access to a plurality of message oriented middleware (MOM) servers via a connectivity layer;
    to establish a connection between a given one of the plurality of applications and a given one of the plurality of MOM servers via the connectivity layer; and to exchange data between the given one of the plurality of applications and the given one of the plurality of MOM servers via the connectivity layer;

wherein the connectivity layer is configured to implement a plurality of client libraries for utilization in connecting the plurality of applications to respective ones of the plurality of MOM servers;

wherein the respective ones of the plurality of MOM servers implement different messaging protocols from each other;

wherein the plurality of client libraries correspond to respective ones of the different messaging protocols;

wherein the respective ones of the plurality of MOM servers comprise at least a first MOM server implementing a first messaging protocol and a second MOM server implementing a second messaging protocol different from the first messaging protocol; and wherein the connectivity layer is configured to implement a first client library of the plurality of client libraries for utilization in connecting one or more of the plurality of applications to the first MOM server, and to implement a second client library of the plurality of client libraries for utilization in connecting the one or more of the plurality of applications to the second MOM server.

2. The apparatus of claim 1 wherein, in providing the plurality of applications with centralized access to the plurality of MOM servers, said at least one processing platform is configured to implement a plurality of application programming interfaces (APIs) to interface with respective ones of the plurality of applications.

3. The apparatus of claim 2 wherein the plurality of APIs comprise Representational State Transfer (REST) APIs.

4. The apparatus of claim 1 wherein, in providing the plurality of applications with centralized access to the plurality of MOM servers, said at least one processing platform is configured to interface with a plurality of application programming interfaces (APIs) corresponding to the respective ones of the plurality of MOM servers.

5. The apparatus of claim 1 wherein the connectivity layer includes a bridge component configured to route data from a given one of the plurality of applications to two or more MOM servers of the plurality of MOM servers.

6. The apparatus of claim 5 wherein the bridge component is further configured to route the data from one of the two or more MOM servers to another one of the two or more MOM servers.

7. The apparatus of claim 1 wherein a load balancer is operatively coupled between the given one of the plurality of applications and the connectivity layer.

8. The apparatus of claim 1 wherein the connectivity layer is implemented at least in part as an add-on component to an enterprise service bus.

9. The apparatus of claim 8 wherein the connectivity layer is configured to publish messages using a plurality of message transport protocols.

10. The apparatus of claim 9 wherein the plurality of transport protocols comprise two or more of Java Message Service (JMS) protocol, File protocol and HyperText Transfer Protocol (HTTP).

11. The apparatus of claim 1 wherein at least one MOM server of the plurality of MOM servers corresponds to a closed MOM platform, and at least one other MOM server of the plurality of MOM servers corresponds to an open source MOM platform.

12. The apparatus of claim 1 wherein the first MOM server is of a first MOM server type and the second MOM server is of a second MOM server type, wherein the first MOM server type is different from the second MOM server type.

13. A method comprising:

providing a plurality of applications with centralized access to a plurality of message oriented middleware (MOM) servers via a connectivity layer;

establishing a connection between a given one of the plurality of applications and a given one of the plurality of MOM servers via the connectivity layer; and exchanging data between the given one of the plurality of applications and the given one of the plurality of MOM servers via the connectivity layer;

wherein the connectivity layer is configured to implement a plurality of client libraries for utilization in connecting the plurality of applications to respective ones of the plurality of MOM servers;

wherein the respective ones of the plurality of MOM servers implement different messaging protocols from each other;

wherein the plurality of client libraries correspond to respective ones of the different messaging protocols;

wherein the respective ones of the plurality of MOM servers comprise at least a first MOM server implementing a first messaging protocol and a second MOM server implementing a second messaging protocol different from the first messaging protocol;

wherein the connectivity layer is configured to implement a first client library of the plurality of client libraries for utilization in connecting one or more of the plurality of applications to the first MOM server, and to implement a second client library of the plurality of client libraries for utilization in connecting the one or more of the plurality of applications to the second MOM server; and wherein the method is performed by at least one processing platform comprising at least one processing device comprising a processor coupled to a memory.

14. The method of claim 13 wherein providing the plurality of applications with centralized access to the plurality of MOM servers comprises implementing a plurality of application programming interfaces (APIs) to interface with respective ones of the plurality of applications.

15. The method of claim 13 wherein the connectivity layer includes a bridge component configured to route data from a given one of the plurality of applications to two or more MOM servers of the plurality of MOM servers.

16. The method of claim 15 wherein the bridge component is further configured to route the data from one of the two or more MOM servers to another one of the two or more MOM servers.

17. A computer program product comprising a non-transitory processor-readable storage medium having stored therein program code of one or more software programs, wherein the program code when executed by at least one processing platform causes said at least one processing platform:

to provide a plurality of applications with centralized access to a plurality of message oriented middleware (MOM) servers via a connectivity layer;

to establish a connection between a given one of the plurality of applications and a given one of the plurality of MOM servers via the connectivity layer; and to exchange data between the given one of the plurality of applications and the given one of the plurality of MOM servers via the connectivity layer;

wherein the connectivity layer is configured to implement a plurality of client libraries for utilization in connecting the plurality of applications to respective ones of the plurality of MOM servers;

wherein the respective ones of the plurality of MOM servers implement different messaging protocols from each other;

wherein the plurality of client libraries correspond to respective ones of the different messaging protocols;

wherein the respective ones of the plurality of MOM servers comprise at least a first MOM server implementing a first messaging protocol and a second MOM server implementing a second messaging protocol different from the first messaging protocol; and wherein the connectivity layer is configured to implement a first client library of the plurality of client libraries for utilization in connecting one or more of the plurality of applications to the first MOM server, and to implement a second client library of the plurality of client libraries for utilization in connecting the one or more of the plurality of applications to the second MOM server.

18. The computer program product of claim 17 wherein, in providing the plurality of applications with centralized access to the plurality of MOM servers, the program code further causes said at least one processing platform to implement a plurality of application programming interfaces (APIs) to interface with respective ones of the plurality of applications.

19. The computer program product of claim 17 wherein the connectivity layer includes a bridge component configured to route data from a given one of the plurality of applications to two or more MOM servers of the plurality of MOM servers.

20. The computer program product of claim 19 wherein the bridge component is further configured to route the data from one of the two or more MOM servers to another one of the two or more MOM servers.

* * * * *

UNITED STATES PATENT AND TRADEMARK OFFICE
CERTIFICATE OF CORRECTION

PATENT NO. : 10,896,077 B2
APPLICATION NO. : 16/353703
DATED : January 19, 2021
INVENTOR(S) : Hung Dinh et al.

It is certified that error appears in the above-identified patent and that said Letters Patent is hereby corrected as shown below:

In the Claims

Claim 9, Column 15, Line 56 please delete "message"

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*